United States Patent Office 3,001,964
Patented Sept. 26, 1961

3,001,964
CHLOROSULFONATED LINEAR POLYETHYLENE EXTENDED WITH CHLORINATED WAX
Kenneth Leron Miller, Beaumont, Tex., assignor to E. I. du Pont de Nemours and Company, Wilmington, Del., a corporation of Delaware
No Drawing. Filed Sept. 24, 1958, Ser. No. 762,940
3 Claims. (Cl. 260—28.5)

This invention is directed to synthetic elastomers, specifically chlorosulfonated polyethylene, and more specifically to a process for improving these chlorosulfonated polyethylenes in several important properties.

Chlorosulfonated polyethylenes, containing chlorine and sulfur within certain limits, have the general properties of natural rubber but are characterized by outstanding resistance to the action of oxygen, ozone, and ultraviolet radiation, and sunlight as regards both discoloring and degradation. Disadvantages which have been hard to eliminate are the poor tack of the uncured material, making fabricating difficult, and the tendency to scorch while being compounded for curing. The conventional method for improving tack, the addition of oily or inherently tacky materials, has been unsuccessful. Where a satisfactory improvement in tack was obtained, curing was impaired or the cured product had a residual tack or very poor physical properties.

These difficulties are overcome and a composition of improved tack before curing is obtained by the compositions of the present invention wherein the chlorosulfonated polyethylene is derived from linear polyethylene and the other component is a chlorinated paraffin wax.

It is an object of the present invention to produce chlorosulfonated polyethylenes having improved properties. It is a further object of the present invention to produce novel chlorosulfonated polyethylene compositions having significantly improved tack, processing safety, and an absence of scorching, while retaining light color and good color stability. It is still a further object to produce such novel compositions which when cured have an improved resistance toward tearing.

These and other objects will become apparent in the following description and claims.

More specifically, the present invention is directed to a highly elastomeric composition comprising an elastomeric chlorosulfonated linear polyethylene, and, a chlorinated aliphatic hydrocarbon wax containing 15 to 55% chlorine in a proportion of between 30 and 200 parts by weight of chlorinated wax per 100 parts of the chlorosulfonated polyethylene.

These compositions not only have greatly improved tack but are still highly elastomeric, and approach, or in several important properties surpass the chlorosulfonated polyethylene now on the market, derived from branched-chain polyethylene. These properties include processing safety, that is, the absence of scorching (precuring) during compounding and processing, and, in cured stocks, resistance to tearing. Valuable properties characteristic of chlorosulfonated polyethylene, such as light color and good color stability, are retained.

The chlorosulfonated products used are derived from linear polyethylenes, characterized by complete or almost complete absence of chain branching, densities greater than 0.935 and usually greater than 0.950, solubility in carbon tetrachloride so as to give at least a 1% solution at 25 to 125° C. and a melt index (see ASTM-D-1238-52T) between about 0.5 and about 20. The chlorine content is usually between 25 and 55% and preferably between 30–45%. The sulfur content is usually between 0.1 and 3.0% and preferably between 0.6 and 2.0. The chlorosulfonation of polyethylene is broadly disclosed and described in U.S. Patent 2,586,363. Chlorosulfonated linear polyethylenes of high chlorine content utilized according to this invention may be prepared by chlorosulfonating polyethylenes produced, for example, by the methods disclosed in U.S. Patents 2,762,791 and 2,816,883 as well as by the so-called coordination polymerization described in U.S. 2,799,668. The method utilized for chlorosulfonating these polyethylenes may be such as that described in U.S. Patent 2,586,363 to McAlevy. Preferably, the products of this invention are made by passing a mixture of chlorine and sulfur dioxide, into a solution of the polyethylene in an inert solvent such as carbon tetrachloride. It is usually advantageous to promote the reaction by means of a source of free radicals such as the organic peroxides or the aliphatic azo compounds described for such purpose by Ernsberger in U.S. Patent 2,503,252. The chlorination and chlorosulfonation procedures may be carried out either as batch operations or continuously.

The chlorosulfonated products may be isolated from the reaction mixture, for example, by removing the solvent by steam distillation as described by Ludlow in U.S. Patent 2,592,814, in which a stream of the solution is introduced transversely into a steam jet submerged in an alkaline solution of a dispersing agent, whereby the products are atomized and freed of carbon tetrachloride, forming granular particles.

The chlorinated wax used is made from paraffin wax having a melting point between 27 and 69° C. and preferably between 48 and 60° C. The chlorine content is between 15 and 55 and preferably between 20 to 43%. It is necessary that the chlorinated hydrocarbon wax not be solid; the higher melting waxes with a chlorine content greater than 55% by weight are solids at room temperature and therefore undesirable. Properties such as resilience, compression set, elongation, and scorch time of mixtures with the chlorosulfonated polyethylene show definite optima within this range.

The ratio of chlorosulfonated polyethylene to chlorinated wax will be chosen so as to give the desired properties, the larger proportions of chlorinated wax giving compositions of greater tack and, within certain limits, greater processing safety but somewhat poorer tensile properties. As the chlorine content of the chlorosulfonated polyethylene increases within the limits defined above, its solvent resistance increases and its resilience and plasticity decrease but none of these changes is great. As the sulfur content increases, the ease of curing and the modulus of the cured chlorosulfonated polyethylene increase and its elongation decreases. As the melt index of the polyethylene used as starting material increases (corresponding to a decrease in molecular weight), the plasticity and tack of the chlorosulfonated products increase. All the chlorosulfonated polyethylenes within the definition are suitable for the practice of the present invention but those outside in general are not. The above observations will make it possible for those using the invention to pick out the most suitable chlorosulfonated polyethylene and chlorinated wax as components for making a composition with specific properties desired The compounding of the mixed chlorosulfonated polyethylene and chlorinated wax of the present invention is similar to that recommended for chlorosulfonated polyethylene itself in Patents 2,416,060, 2,416,061 and 2,723,257. High loading with pigments and fillers such as the titanium dioxide pigments, carbon blacks, barium sulfate, calcium carbonate, silica, calcium silicate, and clay is often useful. Because the compositions of the present invention are relatively very plastic, it is sometimes desirable to disperse the ingredients first by milling with the less plastic chlorosulfonated polyethylene and then add the chlorinated wax.

EXAMPLES

In the following representative examples, chlorosulfonated linear polyethylenes of different chlorine and sulfur contents were mixed with chlorinated waxes of different chlorine contents and compounded as shown (in parts by weight) in the following tables. The stocks were then cured (for 30 min. at 153° C. unless otherwise stated) and tested.

Table I
WHITE STOCKS
[Chlorosulfonated linear polyethylene, 37.5% Cl, 0.6% S, from polyethylene of density 0.960, melt index 0.6. Chlorinated wax, 50% Cl]

| Example No. | 1 | 2 | 3 | Comparison |
|---|---|---|---|---|
| Chlorosulfonated polyethylene | 100 | 100 | 100 | [1] 100 |
| Chlorinated wax | 30 | 70 | 122 | |
| MgO | 20 | 20 | 44 | 20 |
| TiO₂ | 25 | 200 | 178 | 25 |
| Hydrogenated rosin | 2.5 | 2.5 | 5.5 | 2.5 |
| Tetrone A [2] | 1.0 | 1.0 | 2.2 | 1.0 |
| Tack | fair-good | good | excellent | Fair |
| Processing safety: [3] | | | | |
| 5 | | 23 | 20 | 6 |
| 10 | 20 | | | 9 |
| Modulus 100% | 400 | 150 | 200 | 450 |
| Tensile strength | 2,375 | 1,800 | 1,500 | 1,900 |
| Elongation at break | 390 | 580 | 500 | 340 |

[1] Chlorosulfonated branched-chain polyethylene, 29.0% Cl, 1.25% S, from polyethylene of density 0.916, melt index 10.
[2] Dipentamethylene thiuram tetrasulfide.
[3] Time in minutes for a 5 and 10 point rise in Mooney viscosity at 250° F.

Table II
WHITE STOCKS
[Chlorosulfonated linear polyethylene 35.0% Cl, 2.7% S, from polyethylene of density 0.960, melt index 0.6. Chlorinated wax 40 and 50% Cl]

| Example | 4 | 5 | 6 | Comparison |
|---|---|---|---|---|
| Chlorosulfonated polyethylene | 50 | 50 | 40 | [1] 100 |
| Chlorinated wax (40% Cl) | 50 | | | |
| Chlorinated wax (50% Cl) | | 50 | 60 | |
| MgO | 20 | 20 | 20 | 20 |
| TiO₂ | 75 | 150 | 150 | 25 |
| Hydrogenated rosin | 0.8 | 0.8 | 0.8 | 2.5 |
| Tetrone A [2] | 1.7 | 1.7 | 1.7 | 1.0 |
| Tack | Good | Good | Excellent | Fair |
| Processing safety,[3] 5 | | 18 | 14 | 6 |
| Modulus 100% | 330 | 900 | 500 | 375 |
| Tensile strength | 1,600 | 2,400 | 1,600 | 1,800 |
| Elongation at break | 350 | 250 | 250 | 300 |

See table I for footnotes 1, 2, and 3.

Table III
BLACK STOCKS
[Chlorosulfonated linear polyethylene, 37.5% Cl-0.6% S, from polyethylene of density 0.960, melt index 0.6. Chlorinated wax 50% Cl]

| Example | 7 | Comparisons | | | | |
|---|---|---|---|---|---|---|
| Chlorosulfonated polyethylene | 50 | [5] 100 | | [1] 100 | | |
| Chlorinated wax | 50 | | | | | |
| PbO | 25 | 25 | | 25 | | |
| BaSO₄ | 71.7 | 68.5 | | 80.9 | | |
| Carbon black (SRF) | 29.0 | 27.7 | | 32.7 | | |
| Benzothiazyl disulfide | 0.5 | 0.5 | | 0.5 | | |
| Tetrone A [2] | 2.0 | 2.0 | | 2.0 | | |
| Tack | excellent [4] | poor | | fair to good | | |
| Processing safety: [3] | | | | | | |
| 5 | 35 | 25 | | 13 | | |
| 10 | 44 | 30 | | 20 | | |
| | | | | Measured at 70° C. | | |
| Modulus 100% | 250 | 1,500 | 1,500 | 230 | 1,100 | 1,325 |
| Tensile strength | 1,350 | 2,950 | 2,250 | 800 | 2,000 | 1,325 |
| Elongation at break | 400 | 245 | 150 | 320 | 200 | 100 |
| Retention of tensile strength after aging 3 days at 150° C., percent | 70 | 58 | 36 | | | |
| Tear strength (Winklemann) | 259 | 329 | 178 | 133 | 177 | 73 |
| Compression set 70 hrs. at 100° C | 74 | 48 | 78 | | | |
| Swelling in H₂O | 6.4 | 3.9 | 6.9 | | | |
| 20% HNO₃ | 24 | 15 | 40 | | | |
| 20% NaClO | 0.4 | 0.3 | 1.1 | | | |

See Table I for footnotes 1, 2, and 3.
[4] Tack was rated roughly comparable to that of natural rubber and was better for the cold stock than for the control when hot.
[5] Same chlorosulfonated polyethylene as used in Example 7.

Table IV
BLACK STOCKS
[Linear polyethylene variously chlorosulfonated from polyethylene of density 0.960, melt index 0.6]

| Example | 8 | 9 | 10 | 11 | 12 | 13 |
|---|---|---|---|---|---|---|
| Chlorosulfonated polyethylene: | | | | | | |
| Percent Chlorine | 30 | 38 | 41 | 49 | 54 | 54 |
| Percent Sulfur | 0.6 | 0.6 | 0.7 | 0.7 | 1.8 | 1.8 |
| Parts | 100 | 100 | 100 | 100 | 100 | 100 |
| Chlorinated wax, 40% Cl, parts | 50 | 50 | 50 | 50 | 50 | 100 |
| PbO | 20 | 20 | 20 | 20 | 20 | 20 |
| MgO | 10 | 10 | 10 | 10 | 10 | 10 |
| SRF Black | 50 | 50 | 50 | 50 | 50 | 100 |
| Tetrone A | 1.5 | 1.5 | 1.5 | 1.5 | 1.5 | 1.5 |
| Benzothiazyl disulfide | 1.0 | 1.0 | 1.0 | 1.0 | 1.0 | 1.0 |
| Nickel dibutyl dithiocarbamate | 3.0 | 3.0 | 3.0 | 3.0 | 3.0 | 3.0 |
| Modulus 100% | 300 | 100 | 345 | 110 | 750 | 325 |
| Tensile strength | 2,060 | 2,200 | 2,425 | 1,890 | 2,590 | 1,210 |
| Elongation at break | 560 | 500 | 325 | 560 | 225 | 250 |

In the tables, the compounded mixtures of chlorosulfonated linear polyethylene represented by the examples are compared with compounds of the chlorosulfonated branched-chain polyethylene now on the market and, in Table III, with a compound of one of the chlorosulfonated linear polyethylenes. It will be seen that the compositions of the present invention have better processing safety (freedom from scorching) and better tack in the uncured state than either chlorosulfonated polyethylene without chlorinated wax and that in many cases the difference in tack is outstanding, particularly in comparison with the parent linear product. Both elongation and tear resistance of the cured stocks are also increased. On the other hand, other physical properties such as modulus, tensile strength, compression set, etc. are relatively little affected even by large proportions of the chlorinated wax. Similarly such properties as water resistance, resistance to chemical attack and resistance to weathering conditions are not seriously affected. (Effects of weathering are not included in the tables but qualitative observations bear out the above statement, including the lack of discoloring by sunlight.)

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A highly elastomeric composition consisting essentially of (A) chlorosulfonated linear polyethylene having, by weight thereof, a chlorine content between 25 and 55% and a sulfur content between 0.1 and 3.0% and (B) a non-solid chlorinated aliphatic hydrocarbon paraffin wax containing 15 to 55% by weight of chlorine, said paraffin wax being present in said elastomeric composition in a proportion between 30 and 200 parts by weight per 100 parts of said chlorosulfonated linear polyethylene.

2. The composition of claim 1 wherein the chlorine content of said linear polyethylene is between 30 and 45% by weight thereof and the sulfur content is between 0.6 and 2.0% by weight of said linear polyethylene.

3. The composition of claim 1 wherein the chlorine content of said paraffin wax is between 20 and 43% by weight of said wax.

References Cited in the file of this patent

UNITED STATES PATENTS 2,834,749     Salyer et al. _____ May 13, 1958
2,925,354     Berardinelli et al. _____ Feb. 16, 1960

UNITED STATES PATENT OFFICE
CERTIFICATE OF CORRECTION

Patent No. 3,001,964            September 26, 1961

Kenneth Leron Miller

It is hereby certified that error appears in the above numbered patent requiring correction and that the said Letters Patent should read as corrected below.

Column 2, line 18, after "dioxide," insert -- or first chlorine and then a mixture of chlorine and sulfur dioxide, --; column 3, line 2, after "desired" insert a period.

Signed and sealed this 10th day of April 1962.

(SEAL)
Attest:

ERNEST W. SWIDER

Attesting Officer

DAVID L. LADD
Commissioner of Patents